(12) United States Patent  
Chen

(10) Patent No.: US 8,308,014 B2  
(45) Date of Patent: Nov. 13, 2012

(54) FUEL CAP OF INTERNAL COMBUSTION DEVICE

(76) Inventor: Chun-Li Chen, Changhua (TW)

( * ) Notice: Subject to any disclaimer, the term of this patent is extended or adjusted under 35 U.S.C. 154(b) by 270 days.

(21) Appl. No.: 12/898,604

(22) Filed: Oct. 5, 2010

(65) Prior Publication Data

US 2012/0080434 A1    Apr. 5, 2012

(51) Int. Cl.  
*B65D 45/16* (2006.01)

(52) U.S. Cl. ......... 220/326; 220/DIG. 32; 220/DIG. 33; 220/375

(58) Field of Classification Search ............ 220/326, 220/375, 293, 298, 301, 304, 318, DIG. 32, 220/DIG. 33  
See application file for complete search history.

(56) References Cited

U.S. PATENT DOCUMENTS

| | | | | |
|---|---|---|---|---|
| 5,165,565 A | * | 11/1992 | Schlessmann et al. | 220/304 |
| 5,524,786 A | * | 6/1996 | Skudlarek | 220/262 |
| 6,079,582 A | * | 6/2000 | Nickel et al. | 220/238 |
| RE36,927 E | * | 10/2000 | Griffin et al. | 220/326 |
| 7,048,138 B2 | * | 5/2006 | Hagano et al. | 220/304 |
| 2009/0020182 A1 | * | 1/2009 | Groom et al. | 141/349 |

* cited by examiner

*Primary Examiner* — David Fidei  
*Assistant Examiner* — Raven Collins

(57) ABSTRACT

A fuel cap of an internal combustion device includes a fuel cap body, a restraining element, a resilient element, and a positioning element. The slide block of the restraining element is normally resiliently pressed by the resilient element and therefore protrudes from the outer periphery of the main body portion of the fuel cap body. The fuel cap body can be inserted into a fuel tank when the engaging blocks of the fuel cap body are aligned with the gaps of the fuel tank, and the fuel cap body is subsequently secured when the slide block is engaged in a positioning notch formed on the outer projecting wall of the fuel tank. By pushing the pushing plate of the restraining element inward, the slide block is retracted into the slide groove of the fuel cap body to allow removal of the fuel cap body from the fuel tank opening.

7 Claims, 8 Drawing Sheets

FUEL CAP OF INTERNAL COMBUSTION DEVICE

BACKGROUND OF THE INVENTION

1. Technical Field

The present invention relates to a fuel tank cap and, more particularly, to a fuel cap designed for an internal combustion device and featuring easy operation, leakage prevention, and dust-proofness.

2. Description of Related Art

Portable internal combustion devices, such as mowers, blowers, tree felling machines, chainsaws, outboard motors, and so forth, rely on the ignition and combustion of fuel oil in engines to drive cranks and thereby output power. To facilitate fuel refill, the fuel tank of a common internal combustion device is typically provided with a refill opening closed by a fuel tank cap. Due to cost considerations, the fuel tank caps of commercially available internal combustion devices usually adopt an internally and externally threaded structure and are connected to the refill openings by threaded engagement.

While the internally and externally threaded structure provides the intended securing effect, the most complained-about drawback of such threaded connection is that the operator has to rotate the fuel tank cap continuously until the fuel tank cap is removed from or seals the refill opening. Apart from the inconvenience of operation, the conventional fuel tank caps lack an anti-leak structure and may therefore lead to a spill of fuel from the fuel tanks when the internal combustion devices are shaken during operation. Besides, external liquid may also enter the fuel tanks through the fuel tank caps and damage the internal combustion devices as a result. Moreover, the existing fuel tank caps are very likely to be lost, for there are no proper places where they can be put after they are screwed out of the refill openings.

BRIEF SUMMARY OF THE INVENTION

It is an object of the present invention to provide a fuel cap of an internal combustion device, wherein the fuel cap is easy to operate, anti-leak, and dust-proof.

To achieve the above and other objects, the present invention proposes a fuel cap configured for an internal combustion device and to be mounted on the fuel tank opening of a fuel tank. The fuel tank has a plurality of gaps which are formed around the periphery of the fuel tank opening, an outer projecting wall which is circumferentially provided outside the fuel tank opening, and a fuel cap receiving chamber which is located between the fuel tank opening and the outer projecting wall, wherein the top surface of the outer projecting wall is provided with at least one positioning notch. The fuel cap includes a fuel cap body, a restraining element, a resilient element, and a positioning element. The fuel cap body has a main body portion which extends along an axial direction; a turning knob portion which is provided on a top surface of the main body portion; an assembly cavity which is provided between the main body portion and the turning knob portion, extends along a radial direction, and has an open configuration; a slide groove which is formed on the cavity wall of the assembly cavity; and a plurality of engaging blocks which are protrudingly provided on the outer periphery of a bottom portion of the main body portion. The restraining element has a slide block which is slidable along the longitudinal direction of the slide groove. The restraining element also has a pushing plate that can be retracted into the assembly cavity. The resilient element is resiliently compressed between the pushing plate of the restraining element and the turning knob portion of the fuel cap body, thus urging the restraining element to slide outward when the restraining element is retracted. Normally, the slide block of the restraining element is resiliently pressed by the resilient element and therefore protrudes from the outer periphery of the fuel cap body. The positioning element is fixed in the assembly cavity of the fuel cap body, thereby covering the slide block of the restraining element and preventing the pushing plate from coming off the assembly cavity. In addition, there is a space between the positioning element and the turning knob portion. The space allows the pushing plate of the restraining element to move therein in the radial direction.

The fuel cap body can be inserted into the fuel tank when the engaging blocks of the fuel cap body are aligned with the gaps of the fuel tank. Then, by aligning the slide block of the restraining element with one of the at least one positioning notch of the fuel tank, the fuel tank opening is tightly closed by the fuel cap. When the pushing plate of the restraining element is pushed inward, the slide block of the restraining element is retracted into the slide groove, thus allowing the fuel cap body to be removed from the fuel tank opening.

Compared with the existing fuel caps, which are secured by means of a threaded structure and therefore result in inconvenience of operation and lack of watertightness, the fuel cap of the present invention only requires a simple rotating action to rapidly position the slide block of the restraining element in one of the at least one positioning notch of the fuel tank. Therefore, fastening and removal of the fuel cap can be easily and rapidly done, and operational convenience is improved. Furthermore, with an anti-leak ring pressed against the inner wall surface of the outer projecting wall of the fuel tank, leakproofness is ensured to prevent spills of fuel when the internal combustion device is shaken during use.

BRIEF DESCRIPTION OF THE SEVERAL VIEWS OF THE DRAWINGS

The structure as well as a preferred mode of use, further objects, and advantages of the present invention will be best understood by referring to the following detailed description of an illustrative embodiment in conjunction with the accompanying drawings, in which.

DETAILED DESCRIPTION OF THE INVENTION

Figure 1:
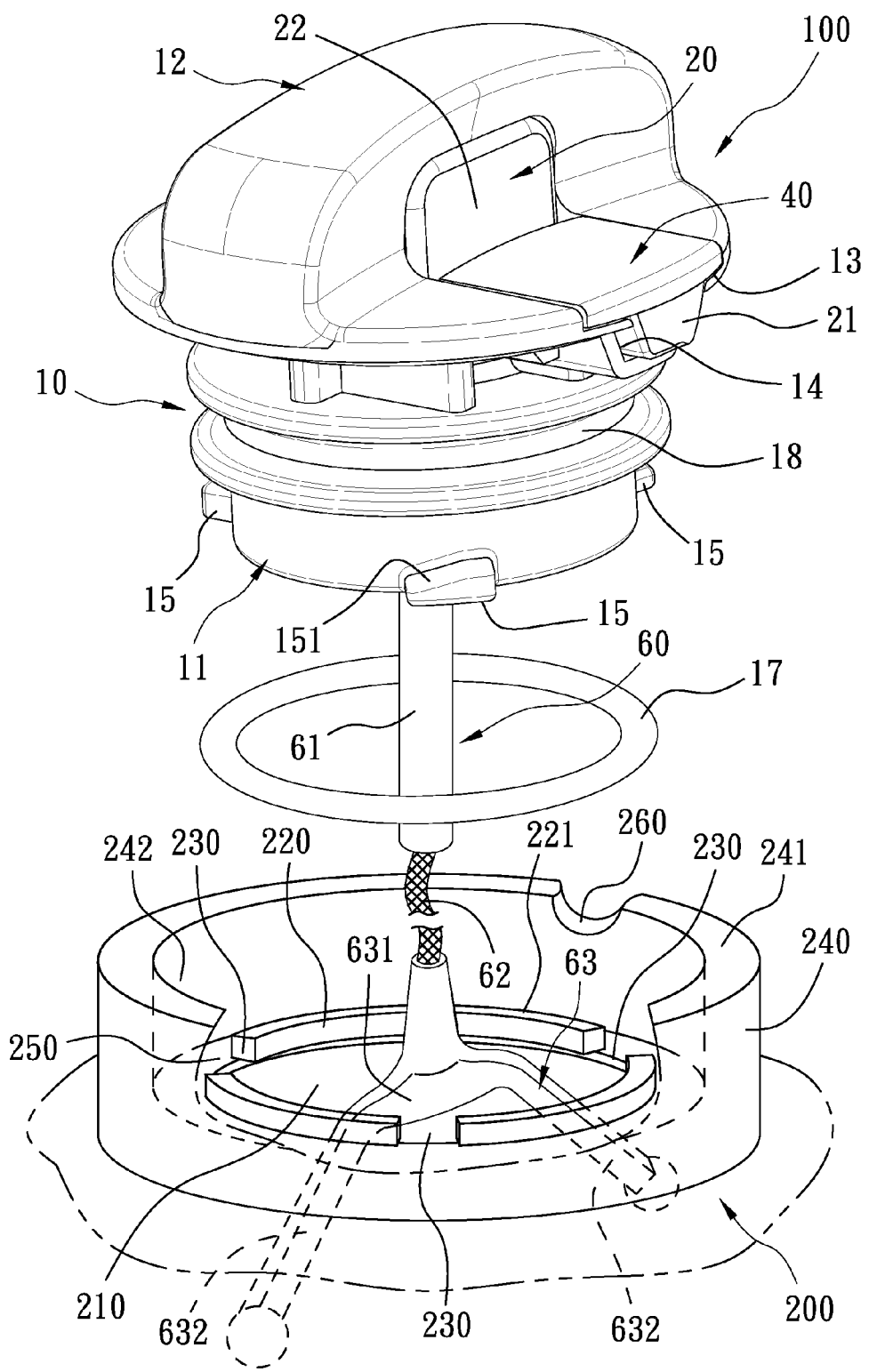
FIG. 1 is an exploded perspective view of a fuel cap of an internal combustion device according to an embodiment of the present invention, showing particularly the fuel cap, an anti-leak ring, and a fuel tank.
Figure 2:
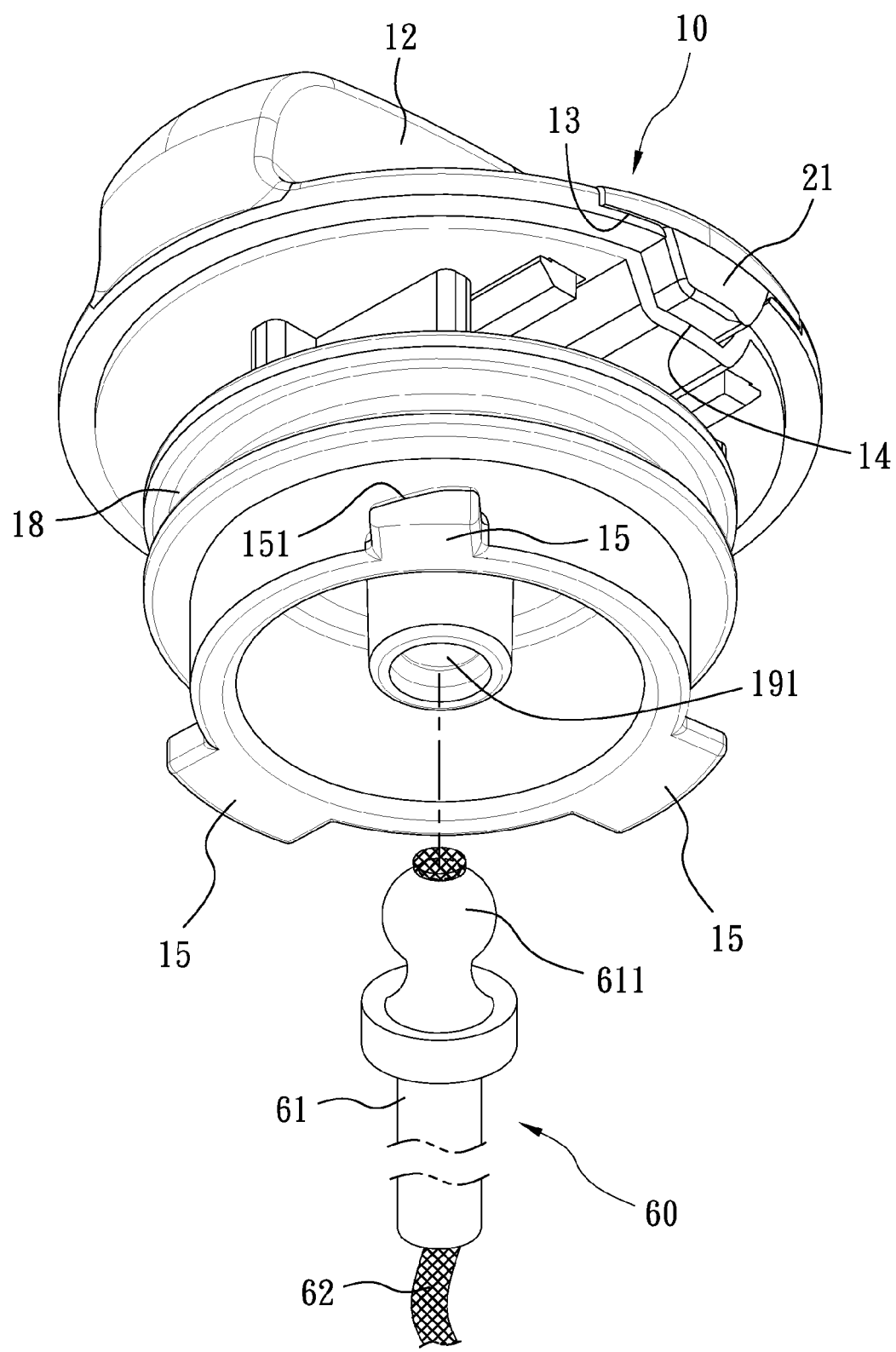
FIG. 2 is another exploded perspective view of the fuel cap depicted in FIG. 1, showing particularly the fuel cap and a hanging cord.
Figure 3:
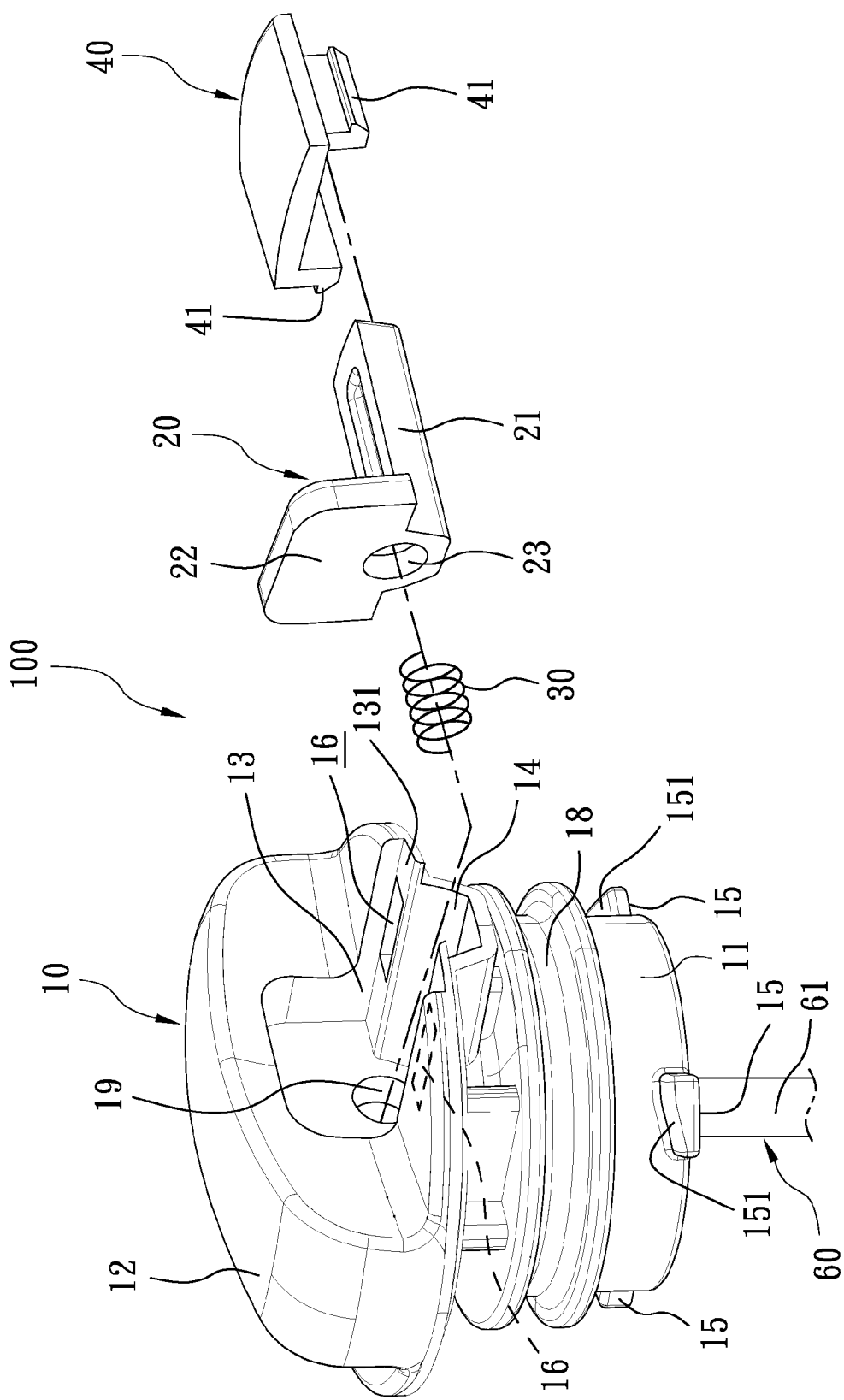
FIG. 3 is yet another exploded perspective view of the fuel cap depicted in FIG. 1, showing particularly a fuel cap body, a restraining element, a resilient element, and a positioning element.

Referring to FIGS. 1, 2, and 3, a fuel cap 100 according to the present invention is configured for an internal combustion device and is to be mounted on the fuel tank opening 210 of a fuel tank 200.

The fuel tank 200 has an inner projecting wall 220 provided around the fuel tank opening 210, a plurality of gaps 230 provided around the periphery of the fuel tank opening 210 and passing through the inner projecting wall 220, an outer projecting wall 240 circumferentially provided outside the fuel tank opening 210, and a fuel cap receiving chamber 250 located between the fuel tank opening 210 and the outer projecting wall 240. The outer projecting wall 240 has a top surface 241 formed with a positioning notch 260.

The fuel cap 100 includes a fuel cap body 10, a restraining element 20, a resilient element 30, a positioning element 40, and a hanging cord 60.

The fuel cap body 10 has a main body portion 11 extending along an axial direction, a turning knob portion 12 provided on a top surface of the main body portion 11, an assembly cavity 13, a slide groove 14, a plurality of engaging blocks 15 protrudingly provided on the outer periphery of a bottom portion of the main body portion 11, and two hook holes 16 provided in the assembly cavity 13 and located on two lateral sides of the slide groove 14 respectively. The assembly cavity 13 is provided between the main body portion 11 and the turning knob portion 12, extends along a radial direction, and has an open configuration. The slide groove 14 is formed on a cavity wall 131 of the assembly cavity 13. The fuel cap body 10 further includes an anti-leak ring 17 encircling a recessed groove 18 formed in a middle section of the main body portion 11. In addition, the turning knob portion 12 has a first recessed portion 19 located inside the assembly cavity 13 of the fuel cap body 10.

The restraining element 20, which is generally L-shaped in cross-section, has a slide block 21 slidable along the longitudinal direction of the slide groove 14, a pushing plate 22 retractable into the assembly cavity 13, and a second recessed portion 23 formed on the pushing plate 22 and corresponding in position to the first recessed portion 19.

The resilient element 30 is a compression spring whose two ends are disposed in the first recessed portion 19 and the second recessed portion 23 respectively. In consequence, the resilient element 30 is restricted between the first recessed portion 19 and the second recessed portion 23 and, when the restraining element 20 is retracted, urges the restraining element 20 to slide outward. In the normal state, the slide block 21 of the restraining element 20 is resiliently pressed by the resilient element 30 and hence protrudes from the outer periphery of the fuel cap body 10.

The positioning element 40 is made of plastic and has a generally inverted U shape. The positioning element 40 is fixed in the assembly cavity 13 of the fuel cap body 10 to cover the slide block 21 of the restraining element 20. Besides, the positioning element 40 is bilaterally provided with two hook portions 41 for engaging with the hook holes 16 of the fuel cap body 10 respectively. Therefore, the positioning element 40 serves to stop the pushing plate 22 and prevent the restraining element 20 from coming out of the slide groove 14 in the radial direction.

Figure 9:
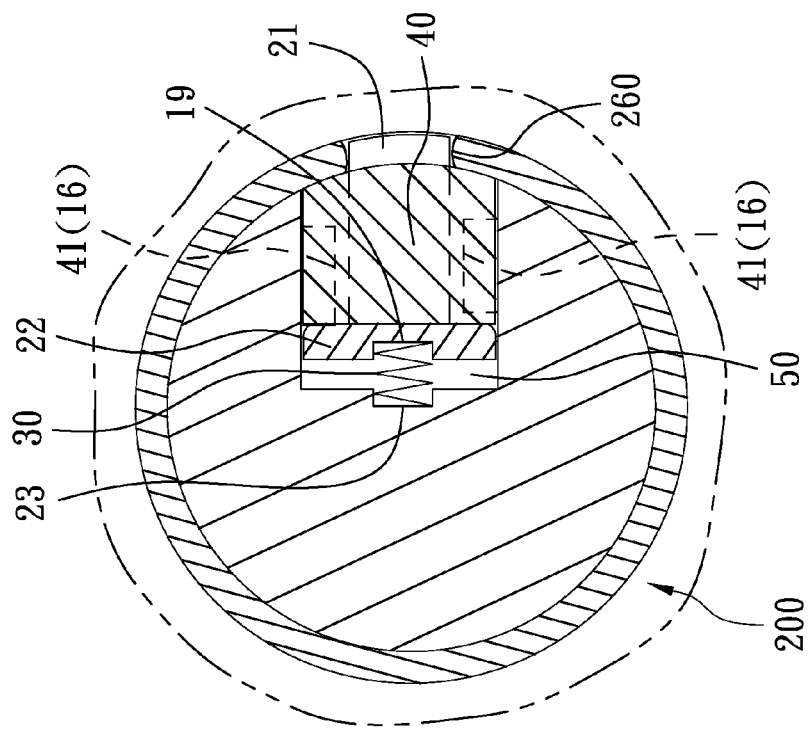
FIG. 9 is a sectional view similar to FIG. 8, showing the slide block of the fuel cap body engaged in the positioning notch of the fuel tank.
Figure 8:
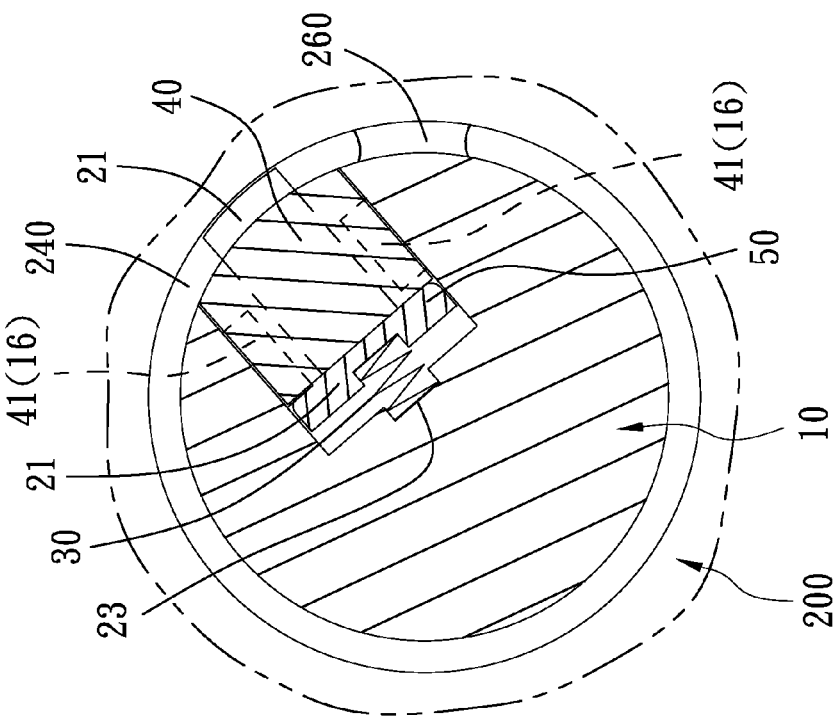
FIG. 8 is a sectional view showing the slide block of the fuel cap body not yet engaged in the positioning notch of the fuel tank.

In addition, referring to FIG. 8 and FIG. 9, a space 50 is formed between the positioning element 40 and the turning knob portion 12 so that the pushing plate 22 of the restraining element 20 can move in the space 50 along the radial direction.

As shown in FIG. 1 and FIG. 2, the hanging cord 60 has a positioning section 61, a connecting section 62, and an expansion section 63 while the fuel cap body 10 further has an engaging hole 191 formed on a bottom surface of the main body portion 11. The positioning section 61 of the hanging cord 60 has a front end provided with a spherical portion 611 configured to fit tightly in the engaging hole 191 and thereby fixedly connect the front end of the hanging cord 60 to the fuel cap body 10. The connecting section 62 of the hanging cord 60 is a flexible cord connected between the positioning section 61 and the expansion section 63. The expansion section 63 has a main body 631 and two resilient portions 632 extending outward from the main body 631. The expansion section 63 can be inserted through the fuel tank opening 210 when the two resilient portions 632 are pushed toward each other. Then, as the two resilient portions 632 resume their original state (see FIG. 1), the expansion section 63 is stuck in the fuel tank opening 210 and prevented from falling out. Therefore, the fuel cap 100, once removed from the fuel tank opening 210 of the fuel tank 200, can hang temporarily on one side of the fuel tank opening 210 so as to be screwed back conveniently in the fuel tank opening 210 and eliminate the chances of the fuel cap 100's getting lost.

Figure 4:
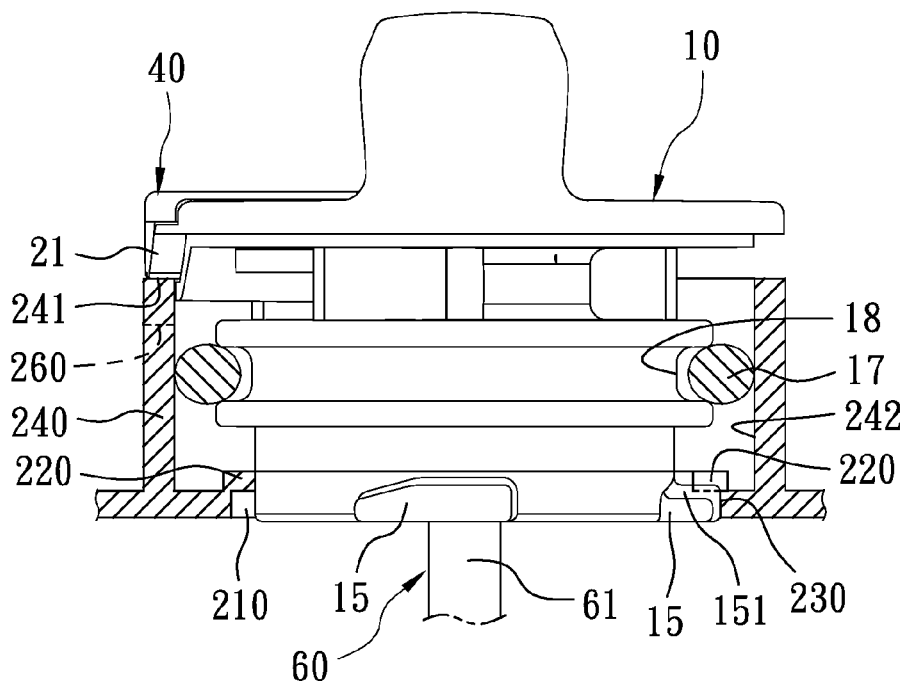
FIG. 4 is a longitudinal sectional view showing the fuel cap body mounted on the fuel tank, wherein the restraining element is not yet fixed in position to the fuel tank.
Figure 5:
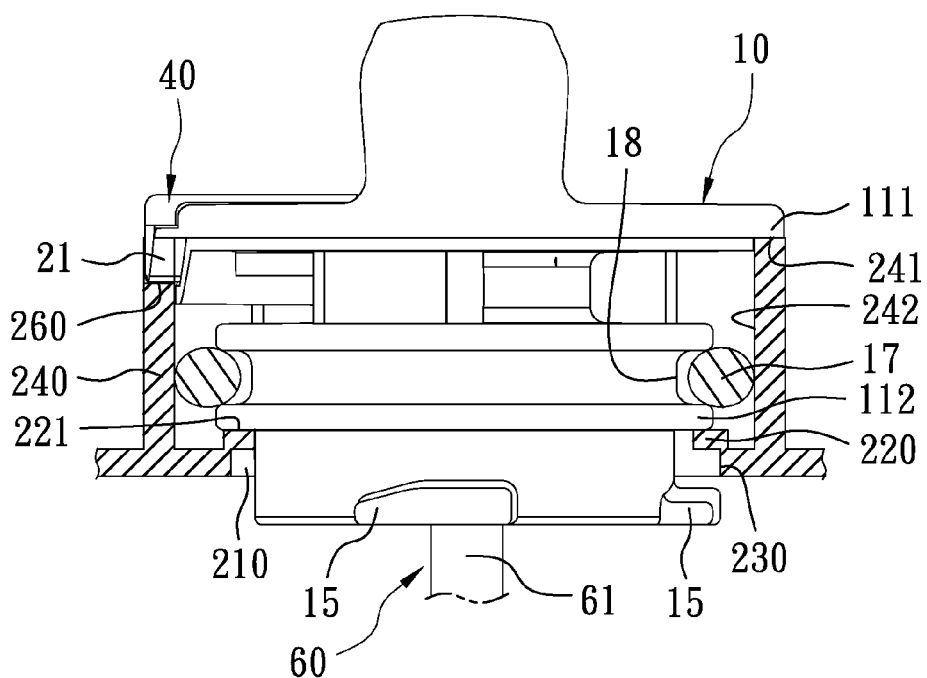
FIG. 5 is another longitudinal sectional view showing the fuel cap body mounted on the fuel tank, wherein the restraining element is engaged in and thereby fixed in position to a positioning notch formed on the fuel tank.
Figure 7:
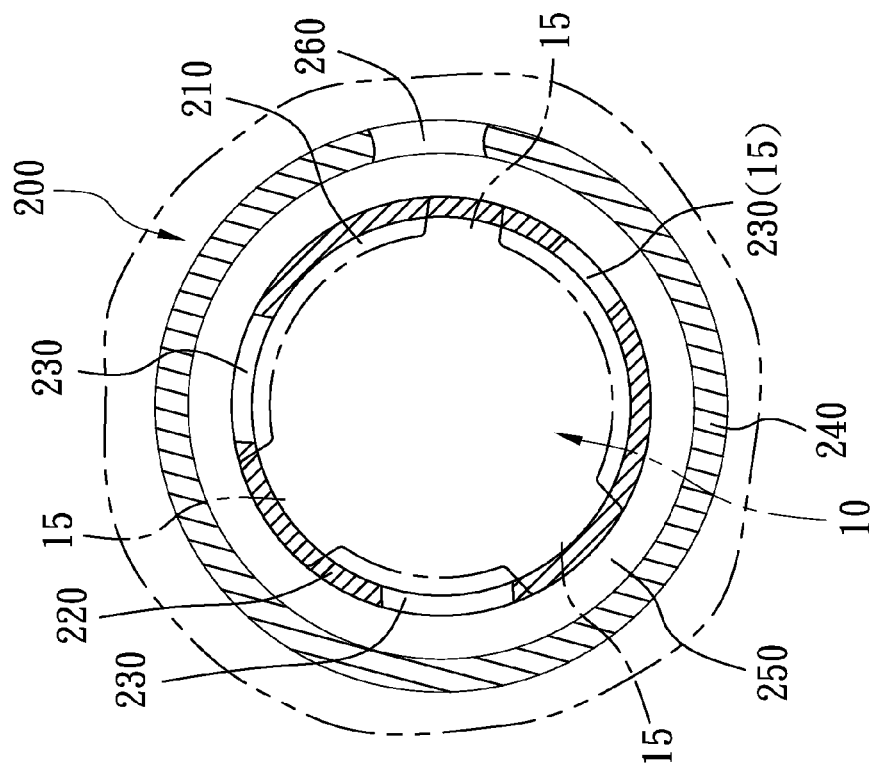
FIG. 7 is a sectional view similar to FIG. 6, wherein the engaging blocks of the fuel cap body have entered the fuel tank through the gaps and are engaged with the opening of the fuel tank.
Figure 6:
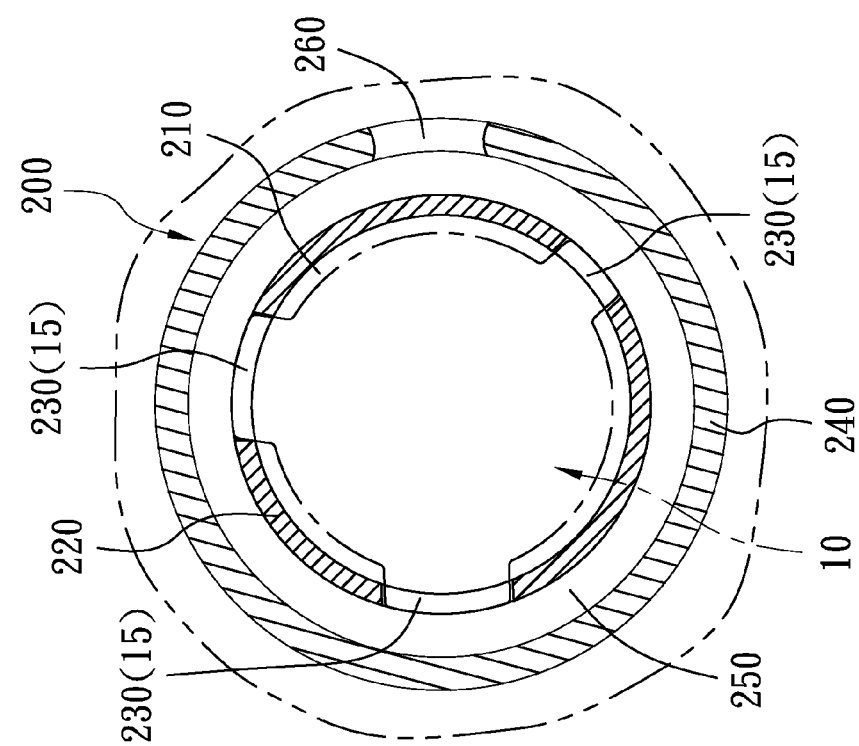
FIG. 6 is a sectional view showing the engaging blocks of the fuel cap body in alignment with gaps formed on the fuel tank.

In the normal state, referring to FIGS. 4, 6, and 8, the slide block 21 of the restraining element 20 is subjected to the resilient force of the resilient element 30 and juts out of the outer periphery of the main body portion 11 of the fuel cap body 10, thereby preventing the fuel cap body 10 from being rotated. To install the fuel cap 100 to the fuel tank opening 210 of the fuel tank 200, the fuel cap 100 is held by the turning knob portion 12, and the main body portion 11 of the fuel cap body 10 is put into the fuel tank opening 210 along the axial direction. Then, the engaging blocks 15 of the fuel cap body 10 are aligned with the gaps 230 and inserted therethrough. Afterward, referring to FIGS. 5, 7, and 9, the fuel cap 100 is rotated so that the slide block 21 is engaged in the positioning notch 260 on the outer projecting wall 240 of the fuel tank 200. Thus, the engaging blocks 15 of the fuel cap body 10 not only are offset from the gaps 230 but also are stuck at and fixed in position to a bottom portion of the fuel tank opening 210, making it impossible to take out the fuel cap body 10 either by pressing it inward or pulling it outward. In other words, the fuel tank cap cannot not be easily opened in this state. Furthermore, anti-leak protection is achieved by a top edge 111 of the main body portion 11 that is now in contact with the top portion 241 of the outer projecting wall 240, a middle flange 112 of the main body portion 11 that is below the recessed groove 18 and now in contact with a top portion 221 of the inner projecting wall 220, and the anti-leak ring 17 that is pressed against an inner wall surface 242 of the outer projecting wall 240. With such anti-leak protection, fuel in the fuel tank 200 is prevented from leaking.

Figure 10:
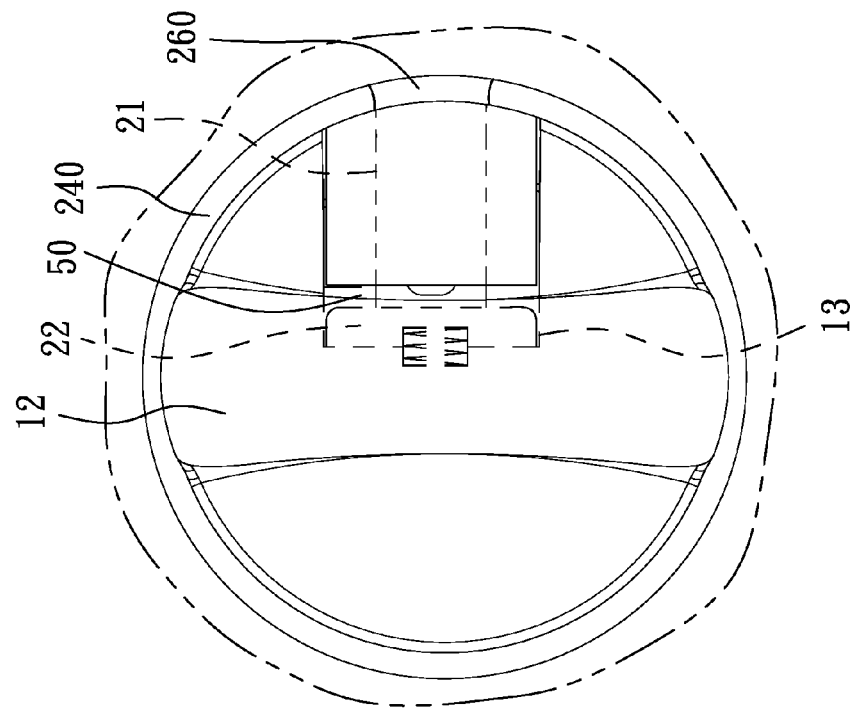
FIG. 10 is a top view showing the slide block of the fuel cap body engaged in the positioning notch of the fuel tank.
Figure 11:
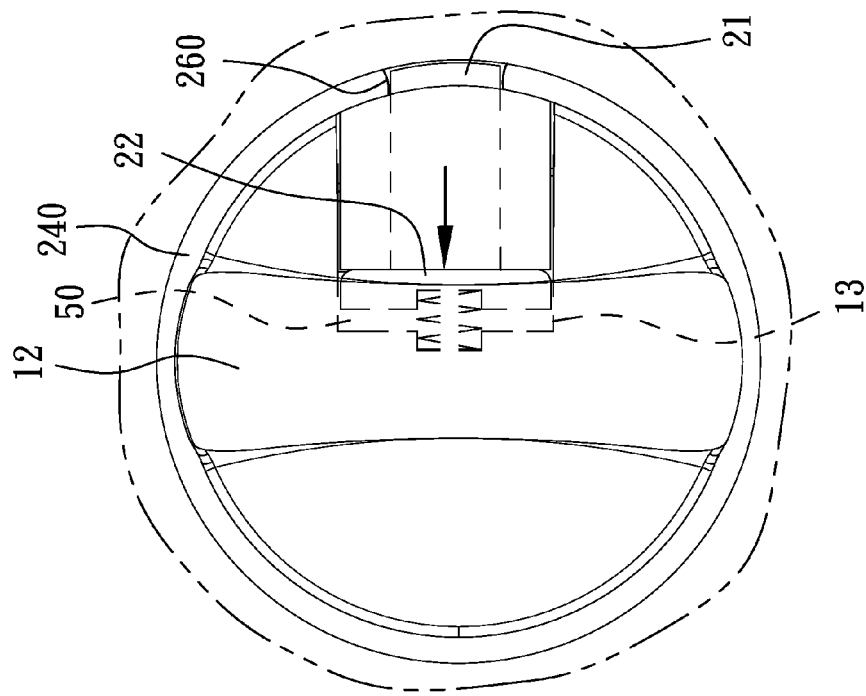
FIG. 11 is a top view similar to FIG. 10, showing a pushing plate being operated in such a way that it is retracted into a slide groove formed in the fuel cap body.
Figure 12:
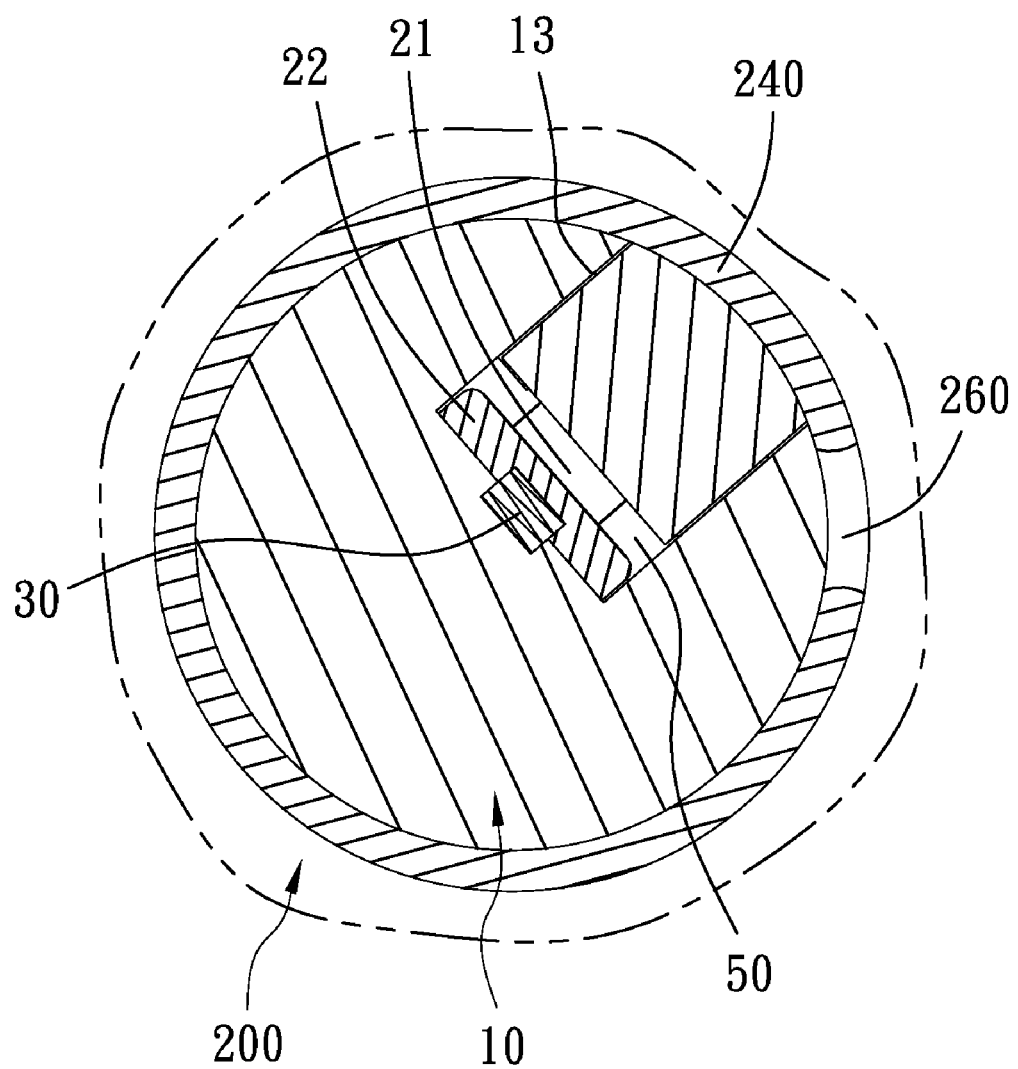
FIG. 12 is a sectional view showing the fuel cap ready to be removed from the fuel tank opening.

With reference to FIG. 10, when the fuel cap 100 is mounted on the fuel tank 200, the pushing plate 22 of the restraining element 20 is partially and protrudingly exposed from the slide groove 14 of the turning knob portion 12. To remove the fuel cap 100 from the fuel tank 200 for fuel refill, the pushing plate 22 is pushed so that it is moved in the space 50 and hidden inside the slide groove 14, as shown in FIG. 11. Consequently, the slide block 21 is disengaged from the positioning notch 260 of the outer projecting wall 240 and retracted into the slide groove 14 while the resilient element 30 enters the compressed state. Then, referring to FIG. 12, the fuel cap 100 is turned again to rotate the engaging blocks 15 into alignment with the gaps 230 (see FIG. 6), thus allowing the fuel cap 100 to be pulled out to open the fuel tank opening 210.

It is worth mentioning that each engaging block 15 of the fuel cap body 10 has a sloping guide surface 151. Therefore, when the fuel cap body 10 is subjected to a rotary fastening action, the engaging blocks 15 are guided via their respective sloping guide surfaces 151 and are easily engaged with the bottom portion of the fuel tank opening 210.

Compared with the existing fuel caps, which are secured by means of a threaded structure and hence lead to operational inconvenience and lack of watertightness, the fuel cap 100 of the present invention can be easily secured through a simple rotating action that allows the slide block 21 of the restraining element 20 to be rapidly positioned in the positioning notch 260 of the fuel tank 200. Thus, not only can the fuel cap 100 be conveniently and rapidly fastened and removed, but also the anti-leak ring 17 pressed tightly against the inner wall surface 242 of the outer projecting wall 240 of the fuel tank 200 ensures leakproofness and dust-proofness, thereby preventing fuel from spilling out when the internal combustion device is shaken during use.

What is claimed is:

1. A fuel cap of an internal combustion device, wherein the fuel cap is mounted on a fuel tank opening of a fuel tank, the fuel tank having a plurality of gaps provided around a periphery of the fuel tank opening, an outer projecting wall circumferentially provided outside the fuel tank opening, and a fuel cap receiving chamber located between the fuel tank opening and the outer projecting wall, the outer projecting wall having a top surface provided with at least a positioning notch, the fuel cap comprising:
    a fuel cap body having a main body portion extending along an axial direction; a turning knob portion provided on a top surface of the main body portion; an assembly cavity located between the main body portion and the turning knob portion, extending along a radial direction, and having an open configuration; a slide groove provided on a cavity wall of the assembly cavity; and a plurality of engaging blocks protrudingly provided on an outer periphery of a bottom portion of the main body portion;
    a restraining element having a slide block slidable along a longitudinal direction of the slide groove and a pushing plate retractable into the assembly cavity;
    a resilient element resiliently compressed between the pushing plate of the restraining element and the turning knob portion of the fuel cap body so as to urge the restraining element to slide outward when the restraining element is retracted, wherein the slide block of the restraining element is normally resiliently pressed by the resilient element and therefore protrudes from an outer periphery of the fuel cap body; and
    a positioning element fixed in the assembly cavity of the fuel cap body so as to cover the slide block of the restraining element and prevent the pushing plate from coming off the assembly cavity, there being a space between the positioning element and the turning knob portion, the pushing plate of the restraining element being movable in the space in the radial direction;
    wherein the fuel cap body can be inserted into the fuel tank upon alignment between the engaging blocks of the fuel cap body and the gaps of the fuel tank; then the fuel tank opening is tightly closed by the fuel cap upon alignment between the slide block of the restraining element and one of the at least a positioning notch; and when the pushing plate of the restraining element is pushed inward, the slide block of the restraining element is retracted into the slide groove to allow removal of the fuel cap body from the fuel tank opening.

2. The fuel cap of claim 1, further comprising an anti-leak ring encircling a middle section of the main body portion of the fuel cap body.

3. The fuel cap of claim 1, wherein the fuel cap body further has two hook holes provided in the assembly cavity and located on two lateral sides of the slide groove respectively, and the positioning element is bilaterally provided with two hook portions for engaging with the hook holes respectively.

4. The fuel cap of claim 1, wherein the turning knob portion has a first recessed portion located in the assembly cavity of the fuel cap body, and the pushing plate of the restraining element has a second recessed portion, the resilient element having two ends disposed in the first recessed portion and the second recessed portion respectively.

5. The fuel cap of claim 1, wherein each said engaging block of the fuel cap body has a sloping guide surface.

6. The fuel cap of claim 1, wherein the fuel tank further has an inner projecting wall provided around the fuel tank opening, and the gaps of the fuel tank pass through the inner projecting wall.

7. The fuel cap of claim 1, further comprising a hanging cord, wherein the hanging cord has a positioning section, a connecting section, and an expansion section, the fuel cap body further having an engaging hole provided on a bottom surface of the main body portion, the positioning section of the hanging cord having a front end provided with a spherical portion configured for fitting tightly in the engaging hole, the connecting section of the hanging cord being a flexible cord connected between the positioning section and the expansion section, the expansion section having a main body and two resilient portions extending outward from the main body, wherein the expansion section can be inserted into the fuel tank opening upon compression of the two resilient portions and is stuck in and prevented from falling out of the fuel tank opening when the two resilient portions resume their original state.

* * * * *